July 2, 1946.  G. G. HOWARD  2,403,368
HOSE COUPLING
Filed Nov. 14, 1942
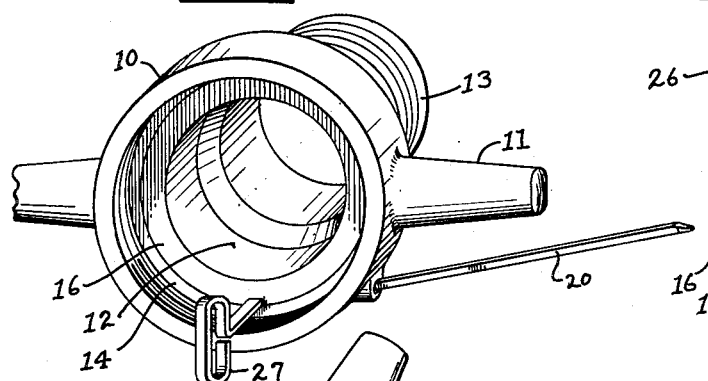
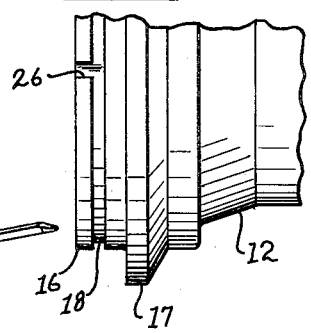
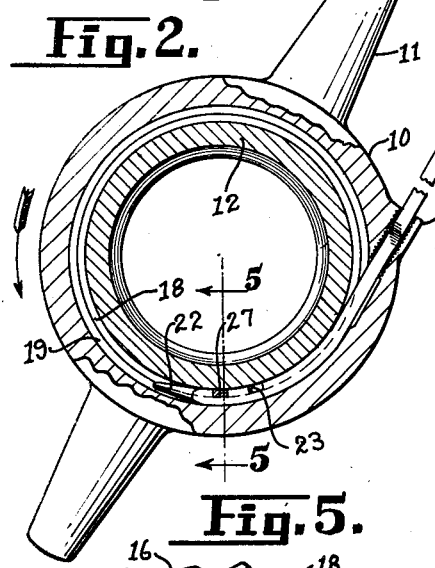
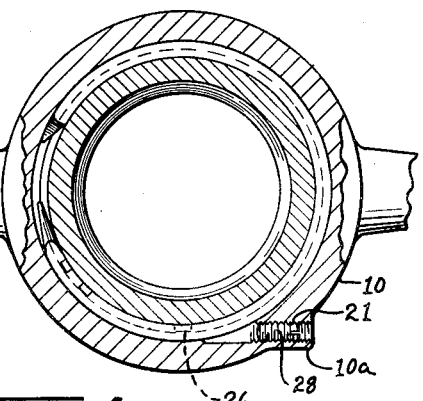
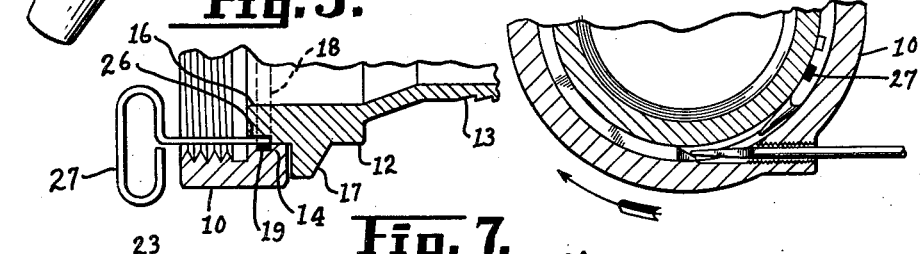
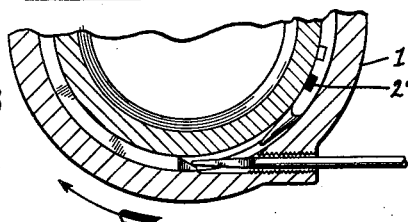
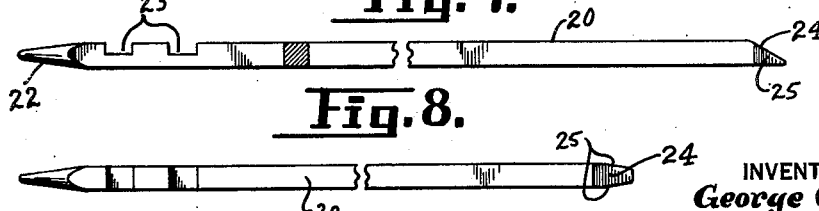
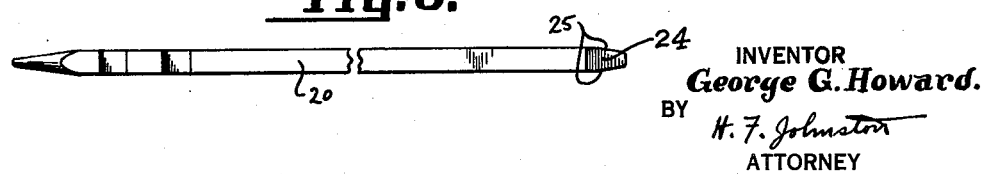
INVENTOR
*George G. Howard.*
BY
*H. F. Johnston*
ATTORNEY Patented July 2, 1946

2,403,368

UNITED STATES PATENT OFFICE 2,403,368

HOSE COUPLING

George G. Howard, Waterbury, Conn., assignor to Scovill Manufacturing Company, Waterbury, Conn., a corporation of Connecticut Application November 14, 1942, Serial No. 465,820

2 Claims. (Cl. 285—97.3)

This invention relates to hose couplings and particularly to a female type of coupling comprising a threaded nut which is swively connected to a body member attached to the end of a hose.

In couplings of the above nature it is the usual practise to swively connect the nut to the body by a locking wire forced through an opening in the nut into complementary grooves provided in interfitted portions of said nut and body. When couplings of a relatively large size are so joined the locking wire must be of a proportionately increased dimension which in practise makes it quite difficult to assemble the wire into place even to the extent of requiring some sort of extra supporting fixture to prevent the wire from buckling when being forced into position from the outside.

It is an object of this invention to construct the locking wire to facilitate its initial assembly and locking of the same to the body preliminary to the act of turning the nut in order to draw the locking wire into the coupling in assembled position, and also to so construct the wire as to facilitate the removal of the same from the coupling in case it is desired to separate the two parts of the coupling.

The full nature of this invention, along with other objects and various advantages thereof, will be more apparent from a consideration of the following description when read in connection with the accompanying drawing, in which:

Fig. 1 is a perspective view of the coupling member showing the locking wire in the course of assembly.

Fig. 2 is a transverse sectional view through the coupling member to show better the manner in which the locking wire is being assembled.

Fig. 3 is a similar view showing the locking wire completely assembled.

Fig. 4 is a fragmentary sectional view showing the manner in which the locking wire may be removed.

Fig. 5 is a fragmentary sectional view taken along line 5—5 of Fig. 2 and showing how the key is assembled to lock the wire to the body for both assembly and disassembly purposes.

Fig. 6 is a fragmentary side view of the body member.

Fig. 7 is a side view of the locking wire per se, and,

Fig. 8 is a top plan view of the same.

Referring now to the drawing in which like numerals designate like parts throughout the several views, the numeral 10 designates a nut having a pair of diametrically extending arms or handles 11 by means of which the nut may be operated in connecting the coupling into a complementary male member of a hose line. The nut 10 is adapted to be swively connected to a body member 12 having a nipple portion 13 which may be inserted into a hose and expanded outwardly to compress the hose therebetween and a suitable ferrule (not shown) surrounding the end of the hose. The nut 10 has an inner flanged portion 14 that fits about a cylindrical neck 16 of the body member 12 adjacent a body abutment flange 17. Within the contiguous surfaces of said body neck 16 and nut flange 14 are provided opposed grooves 18 and 19, the numeral 18 designating the groove in the body neck and 19 the groove in the nut flange 14.

To swively connect the two members 10 and 13 together a longitudinal locking wire 20 is employed that is adapted to be inserted into the nut 10 through a threaded opening 21 aligned with the grooves 18 and 19 and emerging through an embossed portion 10a of said nut. Specifically the invention pertains to this locking wire 20 and the manner in which it is assembled into and capable of being removed from the coupling. It will be noted from Figs. 7 and 8 that the entering or leading end of the locking wire has a conically pointed end 22 and adjacent that end in one of the surfaces is cut a pair of transverse slots 23. To give strength and to afford a smoothly operating swivel joint between the nut and body the locking wire is preferably made of square shaped stock as shown by the sectional portion in Fig. 7. To facilitate the removal of the wire from the coupling the opposite or tail end of the locking wire is formed with a tapered end 24 starting from the surface in which the slots 23 are disposed and progressively decreasing to the opposite surface and the remaining side surfaces of said wire 20 for a shorter distance than the tapered end 24 are convergingly bevelled as indicated by the planes 25. Also as shown in Figs. 3 and 4 the locking wire 70 is of such a length that a considerable clearance is allowed between its ends when the wire is fully disposed in its operating position in the grooves 18 and 19. In other words the axial length of the wire 20 is substantially less than the mean circumferential length of the grooves 18 and 19 so as to assure that a suitable tool can be worked in between the ends of the wire for removing said wire in a manner to be explained later.

When it is desired to assemble the locking wire into the grooves 18 and 19 for swively connecting the nut and body together, the pointed leading end of the wire is inserted through the threaded opening 21 to a position where either one of the slots 23 will align with an axial slot 26 formed in the body neck 16 and intercepting into the body groove 18. When thus aligned a key member 27 as shown in Figs. 1 and 5 is inserted through the axial slot 26 and engages in whichever slot 23 of the wire 20 happens to be aligned with the slot 26, thus locking the leading end of the wire to the body member. The two cross slots in the wire 20, or more may be provided if desired, are for the purpose of making it easier to align any one of the slots 23 in a more or less blind opening with the body axial slot 26. With the wire so locked, the body member may be held in rigid position by a vise or like device while the nut member is turned in a counter-clockwise direction as indicated by the arrow in Fig. 2 by means of the handles or arms 11. The turning of the nut relative to the body wall causes the remaining length of the wire to be drawn through the opening 21 and wrapped completely about the body member 12 within the grooves 18 and 19, such as shown in a completely assembled state in Fig. 3, after which the key 27 may be removed. Since the wire is initially in straight formation and is bent into a curve coincident with the assembly, there is more or less of a spring factor set up in the locking wire tending to spring the same outwardly, which spring factor will cause the wire to be normally tensioned in the nut recess and thus be carried therewith during any swivelling action of the nut relative to the body. When the wire is assembled into place, the key is removed and the threaded opening 21 may be sealed up with a headless set screw 28 threaded thereinto.

If it is desired to separate the coupling members, the nut 10 may be turned carrying the wire 20 with it to a position where either one of the wire cross slots 23 will align with the axial slot 26 in the body to permit the insertion of the key 27 therewithin. The fact that the opening 21 is tangentially aligned with the grooves 18 and 19 and that the length of the locking wire is of less length than the mean circumference of said grooves, will permit the bit of a screw driver or some similarly pointed instrument to be inserted through the opening and angularly cross the grooves 18 and 19 in the manner as shown in Fig. 4. Then by turning the nut in a clockwise direction as shown by the arrow in Fig. 4 while the body is held stationary the end of the screw driver will engage the tapered surface 24 of the tail end of the locking wire 20 and direct it outwardly through the opening 21 during the continuous turning operation of the nut 10.

While I have shown the locking wire anchored to the body member, and indicated that the nut is turned to assemble the locking wire, it will be apparent that a different construction and method may be employed to accomplish the same results, as for instance the leading end of the wire could be locked to the nut 10 and the nut turned in a clockwise direction relative to the body to draw the wire into assembled position.

What I claim is:

1. In a swivel coupling comprising a body and a nut member having interfitted portions with aligned circumferential grooves therewithin, said nut member having an opening leading from the exterior and intercepting the respective groove, a locking wire having a pointed leading end with a cross slot adjacent thereto and a bevelled trailing end, means for locking said wire to said body by the use of a removable key engaging in said wire cross slot and said body axial slot, whereupon said wire may be assembled into the grooves by turning said nut relative to said body and removed from said grooves by inserting an instrument through the nut opening to engage the wire bevelled end and by turning the nut in the reverse direction relative to said body.

2. A locking member for a swivel coupling in the form of a longitudinal piece of wire having a pointed leading end and one or more transverse cross lots adjacent said leading end, the opposite end of said wire having a bevelled end starting from the surface in which one or more cross slots are disposed and progressively decreasing to the opposite surface.

GEORGE G. HOWARD.